United States Patent Office 3,025,565
Patented Mar. 20, 1962

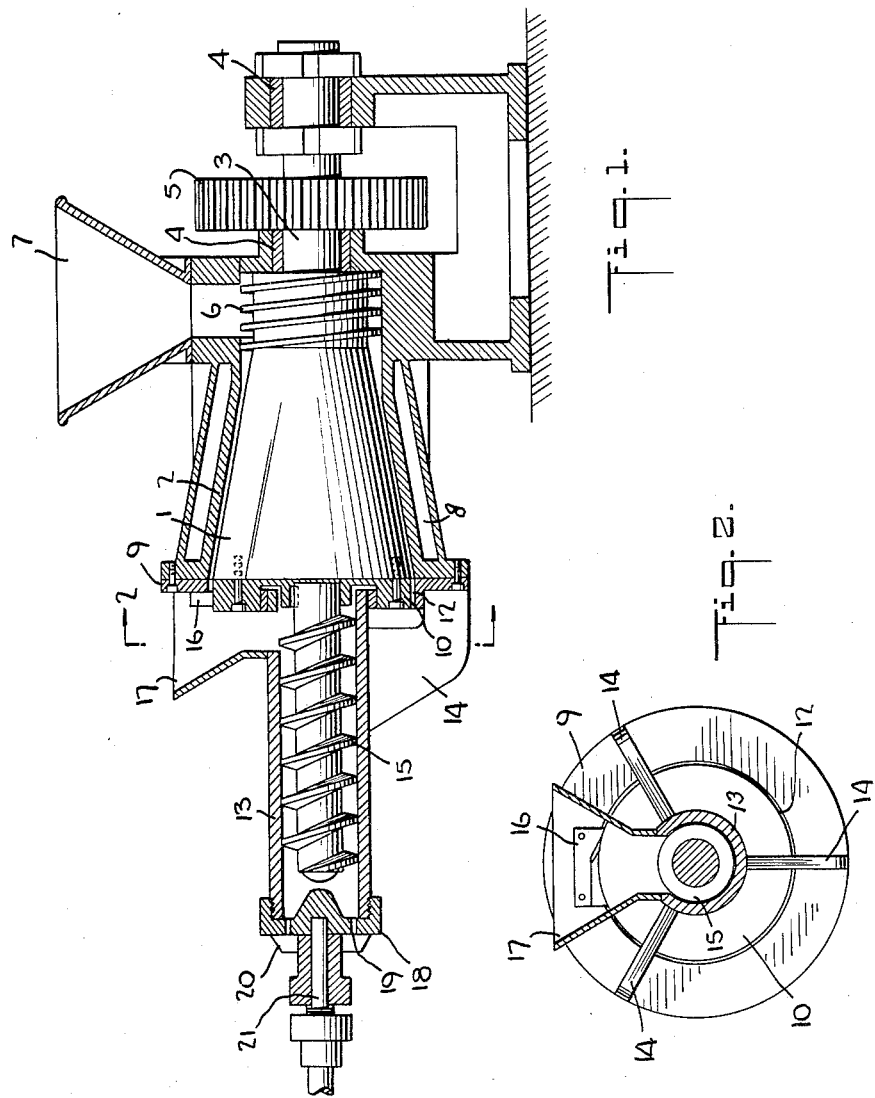

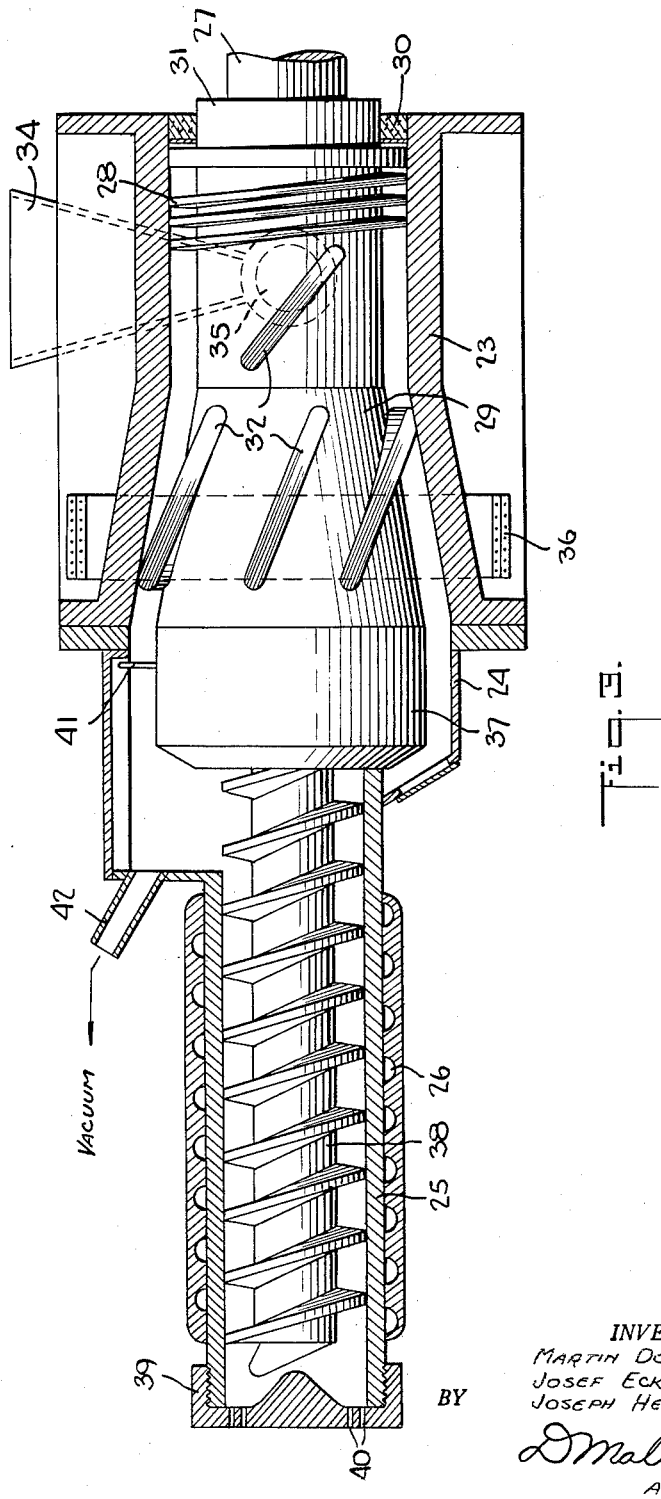

3,025,565
PROCESS AND APPARATUS FOR GRANULATING
AND FORMING PLASTIC MASSES
Martin Doriat, Josef Eckart, and Joseph Heckmaier,
Burghausen, Upper Bavaria, Germany, assignors to
Wacker-Chemie G.m.b.H., Munich, Germany, a corporation of Germany
Filed May 19, 1959, Ser. No. 814,215
Claims priority, application Germany May 28, 1958
4 Claims. (Cl. 18—12)

This invention relates to granulating and forming plastic masses, and it has for its object to provide a novel and improved process and apparatus for this purpose.

Another object of the invention is to provide a simple and efficient process and apparatus for mechanically homogenizing plastifiable materials and for forming or shaping same in a continuous integrated operation.

Still another object is to remove trapped and occluded air, gases and moisture from plastic masses in the course of the homogenizing and forming operation, and thus obtain a superior product at little cost.

Various other objects and advantages will be apparent as the nature of the invention is more fully disclosed.

The processing of synthetic plastic masses, such as polyvinyl chloride, etc., usually consists of the preliminary jellification or plastification, and the subsequent shaping. The plastification can be done in several ways. The original method is the rolling mill, borrowed from the rubber industry. There the material delivered by the rollers is passed on, partly still in warm condition, to the shaping machines such as sprayers or extruders, and partly it is minced in mills into granules and the granules are later shaped in a separate forming operation.

Since rolling plants require a large investment, the tendency has lately been, in spite of the satisfactory jellification on the rollers, to change over to processing granules which are produced on continuous process machines such as double worms, quadruple worms, etc. Such a process, however, has considerable drawbacks. The cold granulate must be heated up again, before the material can be shaped, until it reaches a temperature where it becomes plastic. This made it necessary for extruders to use longer and longer worms, and, depending on the composition of the substance to be extruded, compressions of varying degrees had to be used in the worms. Besides, the material suffers extreme stress thermically due to the heating.

Furthermore, the old rolling mill method is frequently preferred for obtaining highest quality, where the dimensions are large, and the material is passed through the rollers in hot condition, and from there directly to the extruders. Also, it is technically preferred today, to put the extruder directly behind a continuously working jellification machine, in order to shape or granulate the still hot plastic material. However, in such case two aggregates are used, and these are rather expensive.

The present invention provides a novel and highly efficient process and apparatus for continuously plastifying and shaping plastifiable masses such as polyvinyl chloride, etc. In carrying out the continuous process the pre-jellified plastifiable material is fed forward through a restricted cone-shaped space with is preferably continuous and of substantially equal thickness from end to end, from the small end to the large end thereof, as in Patent #2,763,896, issued September 25, 1956, to A. Vogt. The material is thoroughly homogenized in passing through the said restricted cone-shaped space and it emerges through the large end thereof in the form of cords or strands which are severed into short lengths which are immediately carried forward by an extruding worm working in a cylinder having a perforated end plate through which the homogeneous plastified material is discharged in lengths of desired size and shape.

According to another feature of the invention the material, during a substantial portion of its forming stage, is subjected to a vacuum applied between the homogenizing and extruding operations, which effectively removes trapped air, gases and moisture which frequently have a deleterious effect on products of this type and have heretofore been extremely difficult to eliminate.

The invention is described more in detail in connection with certain preferred embodiments illustrated in the accompanying drawings, in which:

FIG. 1 is a longitudinal sectional view of an apparatus embodying the invention;

FIG. 2 is a transverse section taken on line 2—2 of FIG. 1; and

FIG. 3 is a diagrammatic longitudinal section view illustrating a modification of the invention.

The apparatus illustrated in FIG. 1 comprises a rotatable conical body or core 1 which is spaced a short distance from the correspondingly shaped conical wall of a surrounding stationary casing 2.

The conical rotor 1 is supported by a horizontal rotatable shaft 3 which is journaled in suitable bearing 4 and is rotated by any suitable driving means 5.

The small end of the conical rotor 1 has an extension comprising a worm feed 6 to which the material to be processed is fed through hopper 7. The worm 6 feeds the material into the small end of the cone-shaped slit or space between the conical rotor 1 and the conical casing 2, this slit being of substantially equal thickness from the small end to the large end thereof. The casing 2 may be heated or cooled as required, for example by the jacket 8 to which steam or liquid may be supplied in any suitable manner.

The pre-jellified plastic material, such as polyvinyl chloride either alone or mixed with a softener, is introduced into the hopper 7 in the form of powder or chunks, and the worm 6 feeds said material into the small inlet end of the narrow restricted conical space between the rotor 1 and casing 2. In practice, the conical rotor 1 is rotated at any suitable speed, for example about 500 r.p.m. The mass of material, in its passage through the operating space or slit is continuously pressed, kneaded, pulled, drawn, torn and rolled every which-way, and finally arrives at the large outlet end of the conical slit in the form of plastified cords or strands as described in the above-mentioned Patent #2,763,896.

In accordance with a feature of the invention the plastifier apparatus described above has an extension comprising a stationary annular end plate 9 secured to the casing 2, and a circular plate 10 constituting an extension of the large outlet end of the conical rotor 1. The plates 9 and 10 form between them an annular gap or opening 12 through which the plastified material emerges and falls into the extension casing 13.

The said extension casing 13 is an elongated stationary cylinder which is secured to the end plate 9 by brackets 14 and contains a rotatable extruding worm 15 which is carried by the extension plate 10 of conical rotor 1 and is coaxial with the drive shaft 3. The worm 15 makes a close running fit with the interior cylindrical wall of casing 13.

The plastified material emerging from the extension gap 12 in the form of cords or strands is severed by suitable means such as the stripper blade 16 which is mounted on the casing at the highest vertical point on the circumference of the annular discharge gap 12, the circumference of end plate 9 being broken away at this point to accommodate the stripper blade, as shown in FIGS. 1 and 2. The severed material falls down onto the worm 15 immediately below. In the embodiment illustrated, the casing 13 has a flared opening 17 at the top adjacent end plate 9, permitting inspection of the operation and adjustment of the stripper if desired, besides admitting air to the casing.

The worm 15 compacts the plastified material and carries it forward within cylinder 13 and presses it out through the apertured end plate 18 on the forward or emergence end of the cylinder, forming the plastified material into hoses, profiles or other special shapes. For example, in the embodiment illustrated in FIG. 1, the aperture 19 in plate 18 may be a continuous annulus, causing the material to be extruded in the form of a hose, or it may comprise a multiplicity of small individual apertures through which will emerge "rods" of material having a cross-sectional shape determined by the shape of the apertures. Or, if desired, rotating knives 20 carried by a shaft 21 journaled in plate 18 and rotated in any suitable manner, may granulate the material emerging from apertures 19, the material thus dropping out in the form of pellets into any suitable collecting means, not shown.

One advantage of the process and apparatus described above resides in the fact that the shaping and granulation of plastic masses, starting with either a powdery or pasty mixture, is accomplished while making use of the heat at hand. Two work stages are accomplished continuously and simultaneously, namely the continuous plastification and thorough mixing in the plastifier, and the shaping and granulation by the worm mechanism. Another advantage lies in the fact that the worm mechanism is largely independent as respects any form effecting a compression which is necessary with various plastifiable materials when using known devices such as extruders, double worm presses, etc., because the material to be granulated or shaped is already plastic when it falls down into the path of the worm 15.

When processing plastic materials, as herein described, the hot masses frequently contain escaped softener steam, trapped air, gases or moisture caused by reactions, etc., which can have deleterious effects on the finished product, for example in the case of insulation for high tension wires, etc. Machines, especially worm presses, are known where these gases are syphoned off by means of a vacuum. This vacuum is created by syphoning through bore holes in the worm axle or through apertures in the cylinder. In these machines, as heretofore constructed, the vacuum is effective only within a very small space, so that in many cases the deleterious gases cannot be entirely removed.

The removal of such gases is accomplished effectively and completely by the embodiment of the invention illustrated in FIG. 3 which is generally similar to that of FIGS. 1 and 2 except for modifications which make the vacuum highly effective. The apparatus of FIG. 3 comprises the stationary casing 23 which is secured by the gas-tight extension casing 24 to the elongated cylinder 25 having a surrounding mantle or sleeve 26 for the circulation of a heating or cooling fluid. The rotatable shaft 27 carrying the worm feed 28 and the conical rotor body 29 has a gas-tight packing gland 30 associated with the shaft bearing 31. If desired, the conical rotor 29 and its cylindrical rearward extension supporting worm feed 28 may carry ribs 32 slanting with respect to the axis of rotation. The material to be plastified is introduced through hopper 34 and inlet 35 into the space occupied by worm feed 28 whence it is advanced into the small end of the conical opening between conical rotor 29 and the surrounding conical portion of casing 23. As the material passes through the conical space, as previously described, the ribs 32 grip the advancing material and assist in the kneading, drawing and tearing action which converts the material into a homogeneous plastified mass of cords or strands. In its passage through the plastifier the material may be heated, as by means of an electrical resistance heating member 36 outside the casing.

The conical rotor 29 has a forward cylindrical extension 37 within the extension casing 24, and this extension 37 carries the extruding worm 38 which makes a close running fit with the interior cylindrical wall of the elongated cylinder 25. As in the embodiment previously described, the forward end of cylinder 25 has an end plate 39 containing suitable apertures 40 for the extrusion of the final plastified product. The plastified cords or strands transported over the cylindrical extension 37 of conical rotor 29 are severed by a stripper or knife 41 mounted on extension casing 24 before they drop into the intake area of the extruding worm 38.

In the embodiment illustrated in FIG. 3, a pipe 42 connects the upper part of the gas-tight extension casing 24 to a suitable vacuum pump, not shown. The space within the machine which is under vacuum is isolated from the outside atmosphere by the plastified material in the extruding worm cylinder 25 (to the left in FIG. 3) and by the material which has not yet been split up into cords or strands in the conical space between the conical rotor 29 and its surrounding conical casing, and by the packing gland 30 on the bearing 31 of shaft 27. In other words, the vacuum applied to the single pipe 42 is effective over a large area which extends part way into the extruding cylinder 25, includes all of the area encompassed by the extension casing 24, and extends well into the conical space between conical rotor 29 and its conical casing. Thus the plastified material is subjected to the vacuum from the time it assumes the form of cords or strands within the plastifier, up to the time it becomes "packed" between the convolutions of the extruding worm 38 and the cylinder 25. As a result, all occluded gases, trapped moisture, etc., are effectively removed from the formed product which is continuously discharged from the machine.

It will be noted that the cords or strands rolling about in the conical space between rotor 29 and its casing are intensively kneaded while they are under vacuum. In previously known processes the material was merely transported through a brief vacuum zone while said material was in a relaxed state, whereas in our process the vacuum effect is applied strongly to the plastic material during a part of the plastification process under strong kneading, where the surfaces of the material are constantly being renewed due to the rolling and unrolling process.

Although certain specific embodiments have been shown and described herein for purposes of illustration, it will be evident to those skilled in the art that the invention is capable of various modifications and adaptations within the scope of the appended claims.

The invention claimed is:

1. Process for continuously forming shaped plastified masses from a pre-jellified plastifiable material which comprises feeding said material forward in an elongated enclosed passage which is air-tight at all points between an entrance opening at one end of said passage and a restricted discharge opening at the other end of said passage, subjecting the material entering said passage to a continuous succession of ever-changing pressing, kneading, mixing, stretching and twisting forces while converting same from a compact pre-jellified mass adjacent said entrance opening into cords of plastified material beyond said entrance opening, severing said cords of plastified material on a rotating cylindrical surface to reduce their size, worm-feeding said severed cords forward in a mass filling the portion of said passage adjacent said discharge opening and extruding said mass of material out through said discharge opening, and applying a vacuum to said enclosed passage in the area where said cords are severed.

2. Apparatus for forming shaped plastified masses from a pre-jellified plastifiable material comprising, in combination, a plastifier including an elongated rotatable conical body and a closely adjacent surrounding conical casing forming a conical space which is of substantially uniform width throughout the length of said conical body and is entirely open at its large diameter, means for introducing plastifiable material into the space between said body and said casing at the small diameter of said body, an extension on the discharge end of said plastifier including a cylindrical extension secured to said casing and a second cylindrical extension secured to the large end of said conical body and forming a cylindrical extension of the large conical circumference thereof, both of said extensions forming a cylindrical space constituting an extension of said conical space for discharging plastified material from said conical space, an extrusion cylinder connected to said first-mentioned cylindrical extension to receive the plastified material discharged from said conical space, and an extrusion worm in said cylinder secured to said second cylindrical extension and rotated thereby.

3. In an apparatus according to claim 2, a stripper mounted on the casing at the highest vertical point on the circumference of said cylindrical space for severing the plastified material discharged from said space.

4. Apparatus according to claim 2, having means for applying a vacuum to the plastified material in the area of the entrance opening to said extrusion worm in said extrusion cylinder.

References Cited in the file of this patent

UNITED STATES PATENTS

| | | |
|---|---|---|
| 1,156,096 | Price | Oct. 12, 1915 |
| 1,964,266 | McElroy et al. | Nov. 16, 1932 |
| 1,987,358 | Bonnot | Jan. 8, 1935 |
| 2,594,894 | Fehrenbach | Apr. 29, 1952 |
| 2,763,896 | Vogt | Sept. 25, 1956 |

FOREIGN PATENTS

| | | |
|---|---|---|
| 146,897 | Austria | Aug. 25, 1936 |
| 83,961 | Sweden | July 23, 1935 |